United States Patent [19]

Reames, IV

[11] 3,921,454

[45] Nov. 25, 1975

[54] MULTI-INDICATING VACUUM GAUGE

[76] Inventor: Sterling B. Reames, IV, 255-19 147th Drive, Rosedale, N.Y. 11422

[22] Filed: Apr. 2, 1974

[21] Appl. No.: 457,362

[52] U.S. Cl. ................................. 73/401; 73/118
[51] Int. Cl.² ..................................... G01M 15/00
[58] Field of Search ................. 73/119 R, 401, 118

[56] References Cited
UNITED STATES PATENTS

| | | | |
|---|---|---|---|
| 2,809,516 | 10/1957 | Brush | 73/118 |
| 3,122,924 | 3/1964 | Pall | 73/401 |
| 3,138,959 | 6/1964 | Elam et al. | 73/401 |
| 3,349,622 | 10/1967 | Glassey | 73/401 X |

FOREIGN PATENTS OR APPLICATIONS

| 181,886 | 6/1922 | United Kingdom | 73/401 |
|---|---|---|---|

Primary Examiner—Jerry W. Myracle

[57] ABSTRACT

The present invention provides an improved, multi-indicating vacuum gauge for synchronizing the output of all four carburetors of a four cylinder motorcycle. The vacuum gauge of this invention is comprised of an elongated support member that is adapted to be hung in a substantially vertical position on a portion of the motorcycle, for example one of the handlebars. The front surface of the support member is suitably calibrated, for example by a plurality of indicia spaced approximately 2 cm. apart. Four elongated, relatively closely spaced rigid tubes are located in opposition to the calibrated surface of the support member. The lower end of each of the tubes is contained within a single reservoir that is common to all four rigid tubes. A supply of mercury is provided within the common reservoir, well above the lowest level of the four rigid tubes. One end of an elongated, conduit is secured to the upper end of each of the four rigid tubes while the other end of each of the conduits is suitably secured, by means of adapters or fittings, to each of the carburetors. When the engine is running at proper temperature, the vacuum created by each of the carburetors will cause the mercury to be drawn up into four rigid tubes. Observations of the relative levels of the mercury will indicate which, if any, of the carburetors is not functioning properly so that appropriate adjustments can be made and, will also provide a quantitative indication of a malfunction in a specific carburetor.

16 Claims, 10 Drawing Figures

MULTI-INDICATING VACUUM GAUGE

BACKGROUND OF THE INVENTION

1. Field of the Invention

This invention relates generally to vacuum gauges or the like and more particularly to an improved, multi-indicating vacuum gauge that is particularly useful in synchronizing a plurality of carburetors in a multi-cylinder engine.

2. Description of the Prior Art

Motorcycle technology has advanced considerably as compared to but a few short years ago. Motorcycles presently in production are extremely complex and are highly sophisticated machines. Probably one of the best examples of the relatively recent advance in the design and manufacture of motorcycles can be seen in those engines having a plurality of carburetors, one for each cylinder. Motorcycles having four carburetors are presently being manufactured in production quantities by both Honda and Kawasaki. Motorcycles having more than four carburetors have also been built.

As the motorcycle engine becomes more and more complex and more sophisticated, the maintenance and periodic tuning thereof becomes substantially more difficult. Each individual carburetor must be tuned within specific and predetermined factory designated tolerances to provide maximum performance. In a four cylinder motorcycle, it is particularly important that the four carburetors be accurately tuned with respect to each other as well as within the specified tolerances for individual carburetors. That is, the output of the four carburetors must be synchronized in order to provide optimum overall output.

Several devices are presently on the market that are intended for use in the tuning of a four cylinder motorcycle. The first of these devices consists of four separate vacuum gauges secured to a panel that is adapted to be mounted on the motorcycle during the tune-up operation. Each of the four separate vacuum gauges includes a dampening valve and a conduit that is arranged to be secured to one of the carburetors by means of a suitable fitting. As will be explained more fully hereinafter, even the most highly skilled mechanic will experience some difficulty in simultaneously reading and interpreting the four vacuum gauges of the first type of prior art.

Each of the first type of prior art vacuum gauges referred to hereinabove has a 2½ inch face with a dial length of approximately 4.125 inches. To use these four prior art vacuum gauges, the engine is started and warmed up to an operating temperature of between 140° and 175°F. The engine is then stopped and the adapters are inserted into their respective carburetors. With the engine once again running at idling speed, the engine manufacturer recommends that the standard vacuum pressure reading should be between 20cm. and 22cm. of mercury in all four gauges. However, as frequently happens, one or more of the vacuum gauges will indicate a pressure that is either higher or lower than the desired range. When this condition is observed the stop screw is turned either clockwise or counterclockwise in order to adjust the pressure and meet the specification.

The foregoing procedure appears to be relatively simple but in actual practice it is quite the opposite and requires a high degree of skill. As a direct result of the skills required and because of the complexity of the tune-up, the charge by a competent mechanic using the prior art set of four vacuum gauges just described is typically between $40.00 and $60.00. The difficulties with the prior art vacuum gauges may be best appreciated when it is realized that the 4.125 inch dial length is divided into 30 equal parts if it is calibrated in inches of mercury and is divided into approximately 76 equal parts of it is calibrated in centimeters of mercury. That means that the spacing between the calibrations on each dial is only 0.1375 inches apart or approximately 0.055 inches apart, respectively.

It should also be understood that the pointer is approximately 0.0625 inches wide and, with the engine running, it is subjected to severe vibrations that cause it to bounce. The vibrations result primarily from the carburetor piston movement that causes a pulsing action of the vacuum. As a matter of fact, the bouncing of the meter needle is so troublesome that the operating instructions provided by the engine manufacturer specifically suggests that, when the prior art set of vacuum gauges are used, their dampening valves should be adjusted so that the bouncing of the needles is not more than 2cm. However, since the permissable pressure tolerance is only 2cm. (between 20cm. and 22cm.) it will be appreciated that the prior art set of vacuum gauges are extremely difficult to read even under the best conditions. And, when it is considered that the pointer is 0.065 inches wide and the dial calibrations may be as little as 0.055 inches apart at the most, the difficulties involved are substantially increased. Accordingly, it will be readily appreciated that the prior art structure that consists of a set of four separate vacuum gauges is both difficult to read and difficult to interpret, even by a skilled mechanic.

Still another, second type of prior art structure presently available is in the form of a housing having a soft rubber seal that is placed over the mouth of an individual carburetor. An indicator tube is mounted on the housing and is in fluid communication with the carburetor. In this second form of prior art it is essential that the indicator tube, which has a series of markings along the length thereof, be kept in a substantially vertical position at all times. The device is placed over the mouth of the first carburetor and is observed until a pressure responsive button rises in the indicator tube and stops at one of the series of marks. The device is then moved to the mouth of the next carburetor with extreme care being taken to maintain the indicator tube in a perfectly vertical position and without changing the adjustment of the device. The idle of the second carburetor is then adjusted to set the pressure responsive button at the same mark on the indicator. The same procedure is repeated for each of the remaining two carburetors. However, if the idle increases or decreases, then the entire procedure must be started over for all of the carburetors. Should the engine overheat then the process must be repeated after the lapse of a suitable period of time.

With this second form of prior art device it is recommended as a matter of precaution that for any given tune-up, the four carburetors be checked several times using the same procedural steps. As will be evident, this second form of prior art device is functionally a single gauge that can only indicate the vacuum or relative air velocity of a single carburetor at any one time, and, at best, is only an indirect method of measuring. Constant engine speed must be maintained for each reading, and for an air cooled motorcycle engine, a rise in temperature will cause inaccuracies. The resolution of this last mentioned form of prior art is particularly low because of its small size.

SUMMARY OF THE INVENTION

The present invention provides a low cost multi-indicating vacuum gauge that is very accurate and very simple to use in synchronizing the four carburetors of a four cylinder motorcycle engine. An elongated support member is provided with calibrations on one surface thereof, for example approximately 2 cm. apart, and four rigid transparent tubes are positioned in opposition to the calibrations. A single, common reservoir for a supply of mercury is provided at the lower end of and in fluid communication with each rigid tube and a conduit is attached to the upper end of each rigid tube. The function of the conduits is twofold. One function is to transmit the carburetor vacuum to the rigid tubes and thereby draw the mercury upward from the common reservoir into the rigid tubes. The second, concurrent function is to dampen the carburetor vacuum pulsations and thereby provide a steadying effect for observation purposes due to the soft collapsible material from which the conduits are made.

The four conduits may then be coupled to the separate carburetors using conventional fittings. With the engine running at the proper temperature the vacuum produced by each carburetor will pull the mercury from the common reservoir into the four rigid tubes and the relative height of each column of mercury can be readily observed. It is then a very simple matter to adjust the separate carburetors using the calibrations on the support member as a guide to provide more or less vacuum as required and thereby change the height of the mercury column in each of the tubes.

The present invention has an additional feature in that it may be conveniently hung from one of the handlebars of the motorcycle by a resilient member in order to even further minimize or isolate vibrations from the columns of mercury. This feature increases the accuracy and simplifies the reading of the gauge. Another feature of the present invention is the provision of a safety disc at the upper end of the support member. The safety disc will prevent the tubes from striking any hard surface should the gauge be accidently knocked over. The safety disc will also prevent the support member from assuming a horizontal position and will thereby impede the outward flow and loss of the mercury. It is also comtemplated that the present invention will be shipped or sold with a separate supply of mercury. When in use the reservoir is filled as directed and plugged with a foam-type plastic member that will also act to slow down the flow of the mercury should the device be accidentally tipped over.

Accordingly, it is an object of the present invention to provide improved multi-indicating vacuum gauge means for synchronizing the carburetors of a multicylinder motorcycle engine.

Another object of the present invention is to provide an improved vacuum gauge, as described above, wherein four elongated, transparent tubes are positioned in a common reservoir containing a supply of mercury and are in opposition to a calibrated support member.

A further object of the present invention is to provide an improved multi-indicating vacuum gauge, as described above, that has greater resolution than the prior art devices which are presently available.

An additional object of this invention is to provide an improved vacuum gauge, as described above, having visible means for simultaneously indicating the vacuum produced by each carburetor in a multicylinder motorcycle engine which does not require dampening valves.

These and other objects, features and advantages of the invention, will, in part, be pointed out with particularity and will, in part, become obvious from the following more detailed description of the invention, taken in conjunction with the accompanying drawing, which forms an integral part thereof.

BRIEF DESCRIPTION OF THE DRAWING

In the various figures of the drawing, like reference characters designate like parts. In the drawing.

DESCRIPTION OF THE PREFERRED EMBODIMENT

Figure 1A:
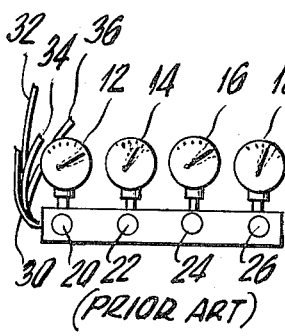
FIG. 1A is an elevational view schematically illustrating a first form of prior art structure.
Figure 1B:
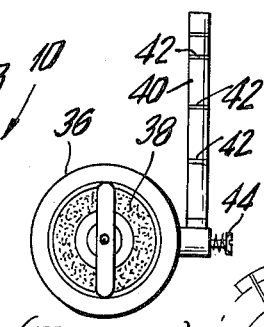
FIG. 1B is an elevational view illustrating another, second form of prior art structure.

Referring first to FIG. 1A and to FIG. 1B, it will be seen that there are two forms of prior art vacuum gauges illustrated. In FIG. 1A the first prior art device 10 consists of four separate gauges 12, 14, 16 and 18 which are each provided with a dampening valve 20, 22, 24 and 26, respectively. Elongated, flexible and resilient conduits 28, 30, 32 and 34 are in fluid communication with their respective gauges 12, 14, 16 and 18 and are adapted to be coupled to the four carburetors of a four cylinder motorcycle engine. As was described hereinbefore, the four vacuum gauges 20, 22, 24, and 26 shown in FIG. 1A are particularly difficult to read and require a high degree of skill in their use. Even with the most competent mechanic, the close calibrations on the vacuum gauges 12, 14, 16 and 18 taken together with the width of their respective pointers, as well as the inevitable bouncing of the pointers and the relatively small acceptable tolerance range of approximately 2cm. renders this form of the prior art very difficult to use.

FIG. 1B illustrates another, second form of prior art vacuum gauge. A housing 36 is provided with a soft rubber seal 38 that is adapted to cover the mouth of the carburetor. An indicator tube 40, having a plurality of vertically spaced markings 42 thereon, must be kept in a perfectly vertical orientation when in use. A plug 44 is rotated until an internal button rises in the indicator tube 40 and aligns itself with one of the markings 42. The housing 36 is then moved to the next carburetor making certain that the indicator tube 40 is always oriented vertically. This procedure is continued on each carburetor until the button within the indicator tube 40 is at the same marking 42 at each test. However, as noted above, if the idle increases or decreases from the initial setting, the entire procedure must be started all over and, in any event, with a device of this type having only minimal accuracy, it is desirable to recheck all of the settings several times. While the structure shown in FIG. 1B is considerable less expensive then the set of four vacuum gauges and the dampening valves shown in FIG. 1A, which typically costs approximately $60.00 for the set, the accuracy that is possible with the structure shown in FIG. 1B is far less than that of the set of vacuum gauges shown in FIG. 1A and is less convenient to use as well.

Figure 2:
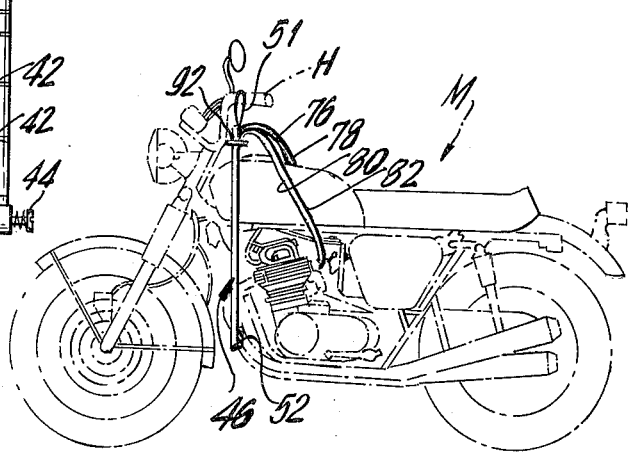
FIG. 2 is an elevational view of the present invention mounted on a multi-cylinder motorcycle which is shown in phantom outline.
Figure 3:
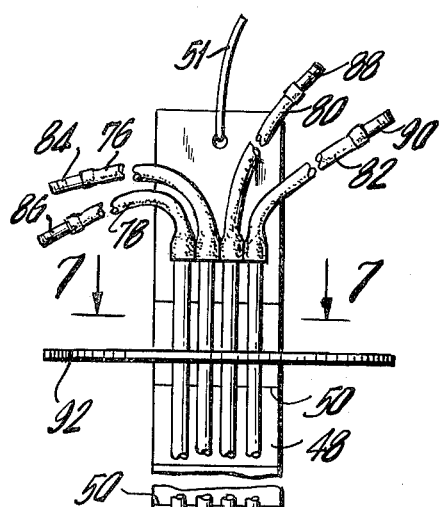
FIG. 3 is a plan view of the motorcycle shown in FIG. 2 together with the vacuum gauge comprising the present invention.

The present invention is shown mounted on one of the handlebars H of a four cylinder motorcycle M in FIG. 2 and in FIG. 3. The vacuum gauge 46 comprising the present invention includes an elongated support member 48 having a plurality of transverse calibrations 50 marked on the front surface thereof, for example 2cm. apart. A resilient member 51 extending through an opening at the upper end of the support member 48 provides the means for supporting the gauge 46 on the motorcycle as shown in FIG. 2 and FIG. 3. In the embodiment illustrated the total length of the support member 48 is approximately 27 inches and may be made from any suitable material such as sheet metal, hard board or the like.

At the lower end of the support member 48 there is provided a common reservoir generally designated by the reference character 52 which may be made from a material such as nylon, a high impact styrene or the like. In the embodiment illustrated, the reservoir 52 is comprised of a front wall 54, two side walls 56 and 58, a rear wall 60 and a bottom wall 62. An elongated transversely oriented groove 63 whose function will be described hereinafter, is formed in the upper surface of the bottom wall 62. The top end of the reservoir 52 is closed by a plug 64 which may be made from any suitable material such as an open cell polyurethane foam or the like.

Figure 4:
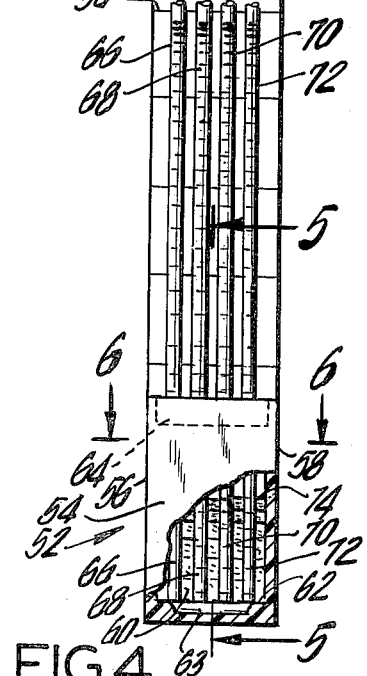
FIG. 4 is a fragmentary, front elevational view, partially broken away, of the vacuum gauge comprising the present invention.
Figure 5:
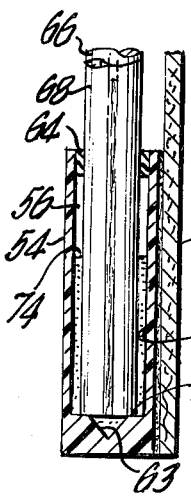
FIG. 5 is a fragmentary, side elevational view, in section, taken along line 5—5 of FIG. 4.
Figure 6:
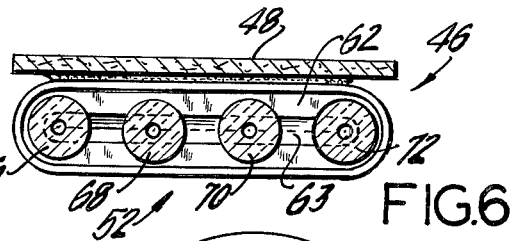
FIG. 6 is a sectional, plan view taken along line 6—6 of FIG. 4.

Four elongated glass tubes 66, 68, 70 and 72, which in the assembled condition such as shown in FIG. 4 cover a transverse span of approximately 1 inch, extend through the plug 64 so that the lower ends of the tubes 66, 68, 70 and 72 are immersed in a bath 74 of approximately 25–50 gms. of mercury contained within the common reservoir 52 and rest on the upper surface of the bottom wall 62. In the embodiment illustrated the four tubes 66, 68, 70 and 72 are made of a transparent material, are approximately 24 inches long, have an outside diameter of approximately 6mm. to 7mm. and have a bore diameter of approximately 1 mm. The length and width dimensions of the groove 63 are selected such that, regardless of the position of the tubes 66, 68, 70 and 72, the bores thereby will always be over the groove 63 so as to assure free flow of the mercury at all times such as shown in FIGS. 4, 5 and 6.

One end of each elongated conduits 76, 78, 80 and 82 is secured to the upper end of each of the tubes 66, 68, 70 and 72, respectively. The other end of each of the conduits 76, 78, 80 and 82 is provided with a fitting or adapter 84, 86, 88 and 90, respectively, which are arranged to be inserted into the four carburetors in a conventional manner. With the engine running at the proper temperature, the vacuum created by each carburetor will cause the mercury supply 74 in the common reservoir 52 to move upwardly within the tubes 66, 68, 70 and 72, and the soft, collapsible material from which the conduits 76, 78, 80 and 82 are made will assure adequate dampening of any vacuum pulsing. The mercury 74 will move upwardly at a rate and to a height that is determined by the vacuum produced by the four carburetors. Thus, it will be a very simple matter to observe the relative heights of the several columns of mercury and then make the appropriate adjustments, if any, to the respective carburetors.

Figure 7:
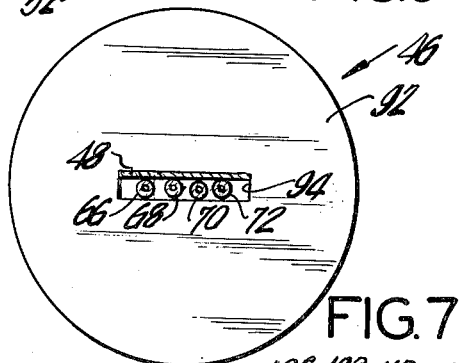
FIG. 7 is another sectional, plan view taken along line 7—7 of FIG. 4.
Figure 8:
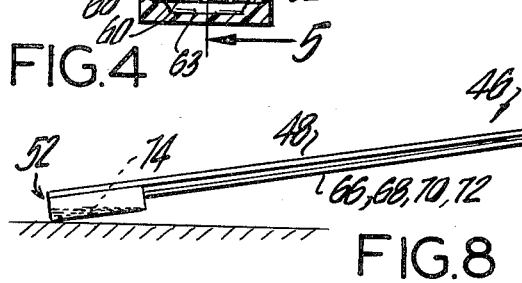
FIG. 8 is a side elevational view illustrating a particular feature of the present invention.

As shown for example in FIGS. 4, 7 and 8, a safety disc 92, having a cutout 94 therein for receiving the support member 48 and the tubes 66, 68, 70 and 72, is positioned proximate the upper end of the support member 48. The safety disc 92, which may be made from any rigid or relatively stiff material serves two useful functions. That is, should the vacuum gauge 46 be inadvertently placed in a position such as shown in FIG. 8 the flow of mercury 74 will be impeded thereby minimizing any loss because the common reservoir can never assume a horizontal position. In addition, the safety disc 92 prevents the glass tubes 66, 68, 70 and 72 from touching and being broken by a hard surface should the vacuum gauge 46 be accidentally dropped.

Figure 9:
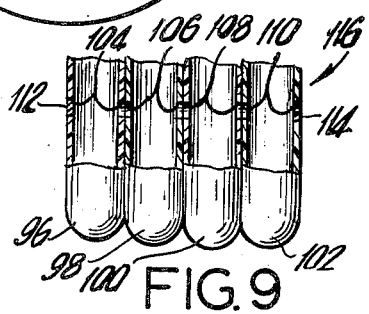
FIG. 9 is a fragmentary elevational view, partially broken away, illustrating an alternative embodiment of the common reservoir comprising this invention.

An alternative embodiment of the "common" reservoir concept of this invention is shown in FIG. 9. Four acrylic test tubes 96, 98, 100 and 102 are secured to each other in any suitable manner, for example by using methyl-ethyl ketone as a bonding agent. Coaxial holes 104, 106, 108 and 110 are formed in opposed wall surfaces of the tubes 96, 98, 100 and 102, respectively, and then the outboard holes 104 and 110 are filled by means of plugs 112 and 114, respectively. The holes 104, 106, 108 and 110 may be formed without fracturing the tubes 96, 98, 100 and 102 by either passing a length of sharpened drill rod therethrough at high speed or by driving a hot wire therethrough. Both techniques are well known in the art. By bonding the four tubes 96, 98, 100 and 102 to each other and by sealing only the two outboard holes 104 and 110, the remaining holes 104, 106, 108 and 110 will provide the required fluid communication so as to define a "common" reservoir 116. Although not specifically illustrated it is to be understood that all of the remaining structure, such as described in connection with the embodiment of FIG. 4 may be used with the "common" reservoir embodiment shown in FIG. 9.

From the foregoing it will be evident that an improved multi-indicating vacuum gauge for synchronizing the four carburetors of a multi-cylinder motorcycle engine has been provided. The provision of an elongated support member having calibrations spaced approximately 2 cm. apart provides resolution approximately seven times greater than the prior art set of four separate vacuum gauges. In addition, the dampening valves that are necessary with the prior art are not required with the present invention. The use of a reservior that is common to the columns of mercury in all four indicator tubes greatly simplified the handling of the mercury and provides for maximum accuracy, while the provision of a safety disc minimizes the loss of mercury as well as possible damage to the four indicator tubes.

By the provision of four, relatively closely spaced columns of mercury overcomes a serious disadvantage of the prior art wherein gauges must be read and then mentally interpreted. At the same time the mechanic must make mental compensations for vacuum gauge needles that bounce. In contrast to the prior art, all that the present invention requires is that the four columns of mercury be at the same height at least within a range defined by two adjacent indicia on the support member. It will be appreciated that mental calculations are not required with the present invention. The close spacing of the columns of mercury covering a total transverse dimension of approximately 1 inch assures that they are all within the line of vision of the mechanic so that the relative heights of the columns of mercury can be readily determined at a single glance.

While the present invention has been described primarily in connection with a four cylinder motorcycle it will be appreciated that the basic concept is equally applicable to a motorcycle having two or more carburetors.

There has been disclosed heretofore the best embodiment of the invention presently contemplated. However, it is to be understood that various changes and modifications may be made thereto without departing from the spirit of the invention.

What is claimed is:

1. A multi-indicating vacuum gauge for use in synchronizing the output of the carburetors of a four carburetor motorcycle engine with respect to each other, said vacuum gauge comprising:
   a. an elongated, calibrated support member adapted to be hung freely on a portion of the motorcycle in a substantially vertical position;
   b. a common reservoir mounted on said calibrated support member proximate the lower end thereof, said reservoir including a base wall having an elongated, transversely oriented groove formed in the upper surface thereof, said reservoir being adapted to receive a supply of mercury;
   c. four elongated tubes each having a bore therethrough, each said tube including upper and lower ends and an intermediate portion, said lower end of each said tube being positioned within said common reservoir below the upper level of the mercury therein with the lower ends of said tubes being positioned on the upper surface of said base wall whereby said bores in said tubes are in opposition to and in fluid communication with said groove said intermediate portion of each said tube being positioned in opposition to said calibrated support member; and
   d. four elongated conduits each having a first end secured to an upper end of one of said tubes, the second end of each said conduit being adapted to be secured to one of the carburetors whereby, when the engine of the motorcycle is running the vacuum created in the carburetors will raise the mercury in said reservoir to a particular level in each said tube, which levels can be made substantially equal by adjusting the carburetors with respect to each other.

2. The vacuum gauge according to claim 1 wherein said support member is calibrated by a plurality of indicia spaced approximately 2 cm. apart.

3. The vacuum gauge according to claim 1 wherein there is further included a resilient member coupled to said support member for hanging said vacuum gauge on the motorcycle.

4. The vacuum gauge according to claim 1 wherein said common reservoir is comprised of a front wall, a rear wall and two spacedly opposed side walls, there being further included a plug in the open, upper end of said common reservoir with said elongated tubes passing through said plug.

5. The vacuum gauge according to claim 4 wherein said plug is porous.

6. The vacuum gauge according to claim 1 wherein said second end of each said conduit includes a fitting that is adapted to mate with a respective carburetor.

7. The vacuum gauge according to claim 1 wherein there is further included a disc mounted on said support member proximate the upper end thereof, said disc being sized so as to prevent said vacuum gauge from assuming a horizontal position.

8. A multi-indicating vacuum gauge for synchronizing the output of a plurality of carburetors in a multicylinder internal combustion engine, said vacuum gauge comprising:
   a. support member;
   b. a plurality of indicating tubes each having a bore therethrough, a lower end, an intermediate portion and an upper end, said intermediate portion of said tubes being positioned in opposition to said support member, said upper end of each said tube being adapted to be placed in fluid communication with a respective one of the carburetors; and
   c. a reservoir for receiving a supply of mercury, said reservoir being common to said lower end of all of said tubes and comprising wall means extending in the same direction as said tubes and a base wall integral with said wall means, said base wall having an elongated, transversely oriented groove formed in the upper surface thereof, the lower end of said tubes being positioned on said upper surface of said base wall whereby said bores in said tubes are in opposition to and in fluid communication with said groove.

9. The vacuum gauge according to claim 8 wherein said support member is calibrated.

10. The vacuum gauge according to claim 9 wherein said support member is calibrated by a plurality of indicia spaced approximately 2cm. apart.

11. The vacuum gauge according to claim 8 wherein there is further included conduit means for providing the fluid communication between said tubes and the respective carburetors thereof.

12. The vacuum gauge according to claim 8 wherein there is further included a resilient member coupled to said support member for hanging said vacuum gauge in a substantially vertical position.

13. The vacuum gauge according to claim 12 wherein said second end of each said conduit includes a fitting that is adapted to mate with a respective carburetor.

14. The vacuum gauge according to claim 8 wherein said common reservoir is further comprised of a front wall, a rear wall and two spacedly opposed side walls, there being further included a plug in the open, upper end of said common reservoir with said elongated tubes passing through said plug.

15. The vacuum gauge according to claim 14 wherein said plug is porous.

16. The vacuum gauge according to claim 8 wherein there is further included a disc mounted on said support member proximate the upper end thereof, said disc being sized so as to prevent said vacuum gauge from assuming a horizontal position.

* * * * *